(12) United States Patent
Miura et al.

(10) Patent No.: US 6,851,298 B2
(45) Date of Patent: Feb. 8, 2005

(54) FLUID LEAKAGE DETECTION APPARATUS AND FLUID LEAKAGE DETECTION METHOD

(75) Inventors: Shimpei Miura, Mishima (JP); Kenji Kurita, Nagoya (JP); Naohiro Yoshida, Okazaki (JP); Kenji Umayahara, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/714,645

(22) Filed: Nov. 18, 2003

(65) Prior Publication Data

US 2004/0099048 A1 May 27, 2004

(30) Foreign Application Priority Data

Nov. 22, 2002 (JP) ........................................ 2002-338658

(51) Int. Cl.$^7$ ................................................ G01M 3/04
(52) U.S. Cl. ...................................... 73/40.5 R; 73/49.5
(58) Field of Search ............................ 732/40.5 R, 49.5

(56) References Cited

U.S. PATENT DOCUMENTS

| | | | | |
|---|---|---|---|---|
| 2,777,812 A | * | 1/1957 | Powell et al. ............... | 376/251 |
| 4,269,061 A | * | 5/1981 | Hatsuno et al. ............. | 73/40 |
| 4,984,448 A | * | 1/1991 | Jordan et al. ............ | 73/40.5 R |
| 4,993,256 A | * | 2/1991 | Fukuda ...................... | 73/49.2 |
| 5,057,822 A | * | 10/1991 | Hoffman .................... | 340/611 |
| 5,152,167 A | * | 10/1992 | Moody ........................ | 73/40 |
| 5,261,268 A | * | 11/1993 | Namba ..................... | 73/40.5 R |
| 5,540,083 A | * | 7/1996 | Sato et al. ...................... | 73/40 |
| 5,554,976 A | * | 9/1996 | Miyauchi et al. ........... | 340/626 |
| 5,719,785 A | * | 2/1998 | Standifer .................... | 702/51 |
| 5,850,037 A | * | 12/1998 | Mullins .................. | 73/40.5 R |
| 5,866,802 A | * | 2/1999 | Kimata et al. ........... | 73/40.5 R |
| 6,070,453 A | * | 6/2000 | Myers ..................... | 73/40.5 R |
| 6,712,045 B1 | * | 3/2004 | McCarthy, Jr. .............. | 123/456 |

FOREIGN PATENT DOCUMENTS

| JP | 58215521 A | * 12/1983 | ............ G01M/3/16 |
|---|---|---|---|
| JP | A 2-176440 | 7/1990 | |
| JP | A 2001-159375 | 6/2001 | |
| JP | A 2002-227727 | 8/2002 | |

* cited by examiner

*Primary Examiner*—Hezron Williams
*Assistant Examiner*—John Fitzgerald
(74) *Attorney, Agent, or Firm*—Oliff & Berridge, PLC

(57) ABSTRACT

In a fluid leakage detection apparatus, hydrogen is supplied from a hydrogen tank to an FC stack of a fuel cell via first and second pipes. An inlet valve is provided between the hydrogen tank and the first pipe, and an outlet valve is provided between the first pipe and the second pipe. A controller serves to control valve opening a valve closing operation of the inlet and outlet valves, respectively. Those valves are closed in a state where the pressure within the hydrogen tank is made lower than the pressure within the first pipe, and the pressure within the second pipe is made lower than the pressure within the first pipe by operating those valves. Thereafter, the increase or decrease in the pressure within the first pipe is detected by a pressure gauge such that the leakage in the inlet valve or the outlet valve is determined. This makes it possible to detect the leakage both in the inlet valve and the outlet valve at the same time.

19 Claims, 7 Drawing Sheets

FLUID LEAKAGE DETECTION APPARATUS AND FLUID LEAKAGE DETECTION METHOD

INCORPORATION BY REFERENCE

The disclosure of Japanese Patent Application No.2002-338658 filed on Nov. 22, 2002, including the specification, drawings and abstract is incorporated herein by reference in its entirety.

BACKGROUND OF THE INVENTION

1. Field of the Invention

The invention relates to a fluid leakage detection apparatus and method for detecting a fluid leakage in a system including a fluid passage that allows the fluid to flow therethrough, and a plurality of valves provided on intermediate portions of the fluid passage.

2. Description of Related Art

Generally a system that includes a piping and a plurality of valves provided on intermediate portions thereof has been known as being used for a fluid supply. A fuel cell system, for example, employs a system for supplying hydrogen and oxygen to the fuel cell. The flow of the fluid can be interrupted by closing valves provided on intermediate portions of the piping.

The aforementioned system employs a detector that detects leakage of the fluid. For example, a difference in the pressure between one side of one of those valves and the other side thereof is caused and the valve is closed so as to check if there is a change in the pressure between one side and the other side of the valve. If there is the change in the pressure, it may be determined that the fluid leaks from the valve.

In the aforementioned art, the fluid leakage can be detected with respect to a single valve only and cannot be detected with respect to more than one valve at the same time. If a plurality of valves should be subjected to the fluid leakage detection, adjustment of the pressure and detection of the pressure change as aforementioned have to be performed one after another. This may make the procedure for such detection cumbersome and complicated.

SUMMARY OF THE INVENTION

It is an object of the invention to provide an apparatus and method that detects leakage of the fluid flowing in a system including a fluid passage and a plurality of valves easily and quickly.

A fluid leakage detection apparatus of a first aspect of the invention, detects a leakage of a fluid in a system including a high-pressure fluid supply source, a fluid passage that passes the fluid from one end that locates at an upstream side close to the fluid supply source to the other end that locates at a downstream side, and a first valve and a second valve each provided on an intermediate portion of the fluid passage from the upstream side. In the fluid leakage detection apparatus, a pressure of the fluid within a detection range between the first valve and the second valve is detected. Then a pressure within the detection range is adjusted into a predetermined reference pressure, a pressure upstream of the first valve is adjusted to be higher than the predetermined reference pressure, and a pressure downstream of the second valve is adjusted to be lower than the predetermined reference pressure, respectively by operating the first valve and the second valve. The fluid leakage detection apparatus serves to determine the leakage of the fluid based on a change in the detected pressure.

This makes it possible to detect the leakage of the fluid out of at least two valves and the fluid passage within the detection range together at the same time.

There may be the case that the fluid leaks firm a crack portion of the fluid passage in the detection range. The detection apparatus may be structured to detect the leakage of the first and the second valves only. Attentively it may be structured to detect the leakage of the first valve and the fluid passage only.

Any type of the fluid may be applied to the invention so long as it flows through the fluid passage. It may be in the form of gas, for example, propane gas, hydrogen, oxygen and the like, or in the form of liquid, for example, gasoline, petroleum, and arbitrary type of water such as waste water.

The system including the fluid passage and valves may be structured to supply hydrogen or oxygen to the fuel cell, or to circulate cooling water. It is not limited to the one provided for the fuel cell but for various types of apparatus. It may be structured to supply, for example, fuel, cleaning fluid, lubricating oil and the like.

The first valve and the second valve may be provided at an upstream-side end portion and/or a downstream-side end portion of the fluid passage.

The detection apparatus may be structured to detect each leakage of three or more valves at the sametime. In the system in which three or more valves are provided in series on the fluid passage, each leakage of three or more valves can be detected at the same time if each pressure in the detection range, upstream side and downstream side of arbitrary two adjacent valves is set such that the aforementioned relationship thereamong is kept.

The fluid leakage detection apparatus may be strictured to determine that the first valve has the leakage of the fluid when the detected pressure of the fluid within the detection range becomes higher than the predetermined reference value.

This makes it possible to detect the fluid leakage of the first valve simultaneously with the detection of the fluid leakage of the second valve and the fluid passage in the detection range. When the value obtained by subtracting the reference pressure from the pressure in the detection range becomes equal to or larger than a predetermined value, it is determined that the pressure has been increased. The increase in the pressure may be determined if the increase ratio of the pressure in the detection range becomes equal to or larger than a predetermined value, or the decrease ratio of the pressure becomes equal to or smaller than a predetermined value.

The fluid leakage detection apparatus may be structured to determined that one of the second valve and the fluid passage within the detection range has the leakage of the fluid when the detected pressure of the fluid within the detection range becomes lower than the predetermined reference pressure.

This makes it possible to detect the fluid leakage of the second valve or the fluid passage in the detection range simultaneously with the detection of the fluid leakage of the first valve. When the value obtained by subtracting the pressure within the detection range from the reference pressure becomes equal to or higher than a predetermined pressure, it may be determined that the pressure has been decreased. When the decrease ratio of the pressure within the detection range becomes equal to or larger than the predetermined value or the increase ratio becomes equal to or smaller than a predetermined value, it may be determined that the pressure has been decreased.

The aforementioned predetermined values may be set based on an amount of change caused in the pressure within the detection range in the state where the fluid leaks from the first or the second valve.

The pressure in the detection range, the pressure upstream of the first valve, and the pressure downstream of the second valve may be adjusted in accordance with a predetermined pressure in an arbitrary manner as described below.

The fluid leakage detection apparatus may be structured to close the first valve that has been held in an opened state, and upon elapse of a predetermined time period from closing of the first valve, further closes the second valve that has been held in an opened state.

This makes it possible to allow the pressure adjustment by the apparatus with a simple structure. The required pressure adjustment may be realized by shifting the timing for closing the first valve from the timing for closing the second valve.

The fluid leakage detection apparatus may be structured to determine that the first valve has the leakage of the fluid when the detected pressure within the detection range is higher than a predetermined pressure in a period from a time at which the first valve is closed to a time at which the second valve is closed.

This makes it possible to quickly detect the fluid leakage of the first valve without the need of completing the pressure adjustment. The predetermined pressure may be set to the value ranging from the pressure upstream of the first valve to the reference pressure.

The fluid leakage detection apparatus may be structured to close the first valve after closing the second valve, and operates the closed second valve thereafter such that the pressure within the detection range becomes the predetermined reference pressure.

This makes it possible to perform the pressure adjustment even in the system where the pressure downstream of the second valve and the pressure in the detection range are momentarily uniformized. Such system may include the one in which the second valve is provided on a mid portion of the fluid passage with small cross section area, or the capacity of the fluid passage in the detection range is small. The aforementioned pressure adjustment may be applied to the system other than the aforementioned one.

The fluid leakage detection apparatus may be structured to determine that one of the second valve and the fluid passage in the detection range has the leakage of the fluid when the detected pressure within the detection range becomes lower than a predetermined pressure in a period from a time at which the second valve is closed to a time at which the second valve is operated.

This makes it possible to detect the fluid leakage of the second valve quickly without the need of completing the pressure adjustment. The predetermined pressure may be set to the value ranging from the pressure upstream of the first valve to the reference pressure.

In the fluid leakage detection apparatus, a fluid utilizing mechanism is provided downstream of the second valve so as to be operated with the fluid, and the controller serves to operate the fluid utilizing maim for reducing a pressure downstream of the second valve.

This makes it possible to perform the pressure adjacent easily as well as prevent the fluid from being wasted during the pressure adjustment. If the fluid is likely to give an unfavorable influence on the environment such as hydrogen, the mechanism that utilizes the fluid is operated such that the fluid is not discharged into atmosphere.

The aforementioned mechanism that uses the fluid may be in various forms to, for example, consume, accumulate, absorb, or discharge the fluid. It may be in the form of the fuel cell or the combustion device that burns gas such as propane gas. It may also be the tank that accumulates the fluid. It may be liquid, gas, or solid that absorbs the fluid such as metal hydride (as hydrogen absorbing alloy). Alternatively, it may be the discharging device that functions in discharging the fluid into atmosphere.

In the fluid leakage detection apparatus, the fluid utilizing mechanism may be formed as a fuel cell, and the fluid may be hydrogen.

In the fluid leakage detection apparatus, the detection range of the fluid passage is connected to a supply pipe for supplying the fluid thereto, the supply pipe is provided with a check valve that prevents a reverse flow of the fluid from the detection range to the supply pipe, and a reverse flow prevention portion is provided for reducing a pressure of the fluid within the supply pipe prior to determination of the leakage.

This makes it possible to perform the pressure adjustment, and to avoid the pressure change in the detection range owing to the fluid flowing from the supply pipe. As a result, the fluid leakage may be accurately performed.

A fluid leakage detection method of a second aspect of the invention, detects a leakage of a fluid in a system including a high-pressure fluid supply source, a fluid passage that passes the fluid from one end that locates at an upstream side close to the fluid supply source to the other end that locates at a downstream side, and a first valve and a second valve each provided on an intermediate portion of the fluid passage from the upstream side. In the fluid leakage detection method, a pressure of the fluid within a detection range between the first valve and the second valve is detected. Then a pressure within the detection range is adjusted into a predetermined reference pressure, a pressure upstream of the first valve is adjusted to be higher than the predetermined reference pressure, and a pressure downstream of the second valve is adjusted to be lower than the predetermined reference pressure, respectively by operating the first valve and the second valve. The fluid leakage detection method serves to determine the leakage of the fluid based on a change in the detected pressure.

BRIEF DESCRIPTION OF THE DRAWINGS

The foregoing and farther objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Preferred embodiments of the invention will be described with respect to the following aspects:

A: structure;
B: control routine;
C: modified example 1; and
D: modified example 2.

A: Structure

Figure 1:
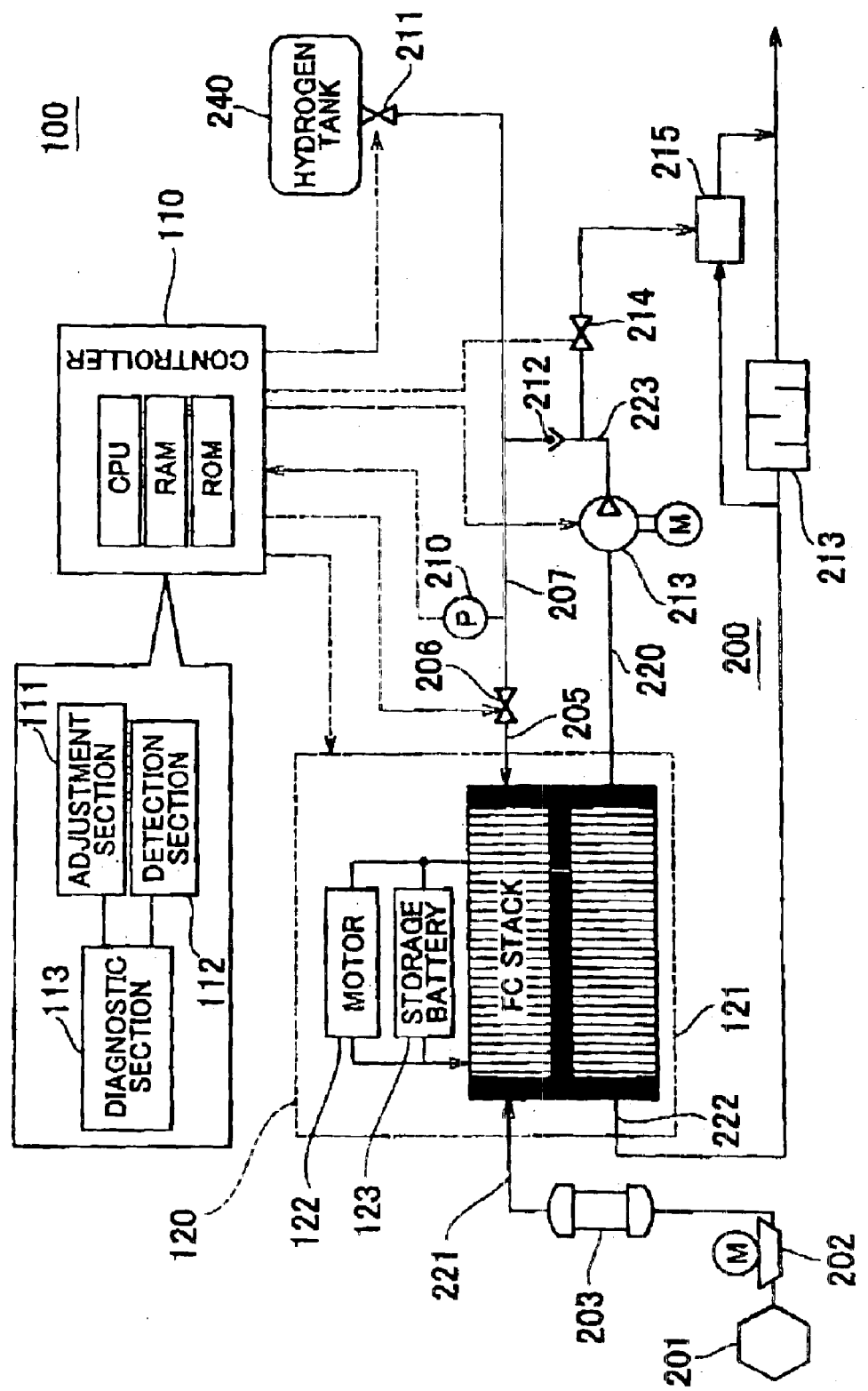
FIG. 1 is a schematic view of a fuel cell system as an embodiment of the invention.

FIG. 1 is a schematic view showing a fuel cell system 100 as an embodiment of a fluid leakage detection apparatus of the invention. The fuel cell system includes a power generation system 120, a piping 200 for charging/discharging hydrogen and oxygen with respect to the power generation system 120, and a controller 110 that controls the power generation system 120 and the piping 200. The fuel cell system 100 according to the embodiment includes the function that detects leakage of hydrogen from the piping 200. The fuel cell system 100 according to the invention may be applied to the electric vehicle.

The power generation system 120 includes an FC stack (a fuel cell) 121, a motor 122 and a storage cell 123. The FC stack 121 receives supply of hydrogen and oxygen from the piping 200 so as to be subjected to chemical reaction for generating power. The FC stack 121 receives supply of hydrogen from a pipe 205 and air as gas containing oxygen from a pipe 221. A cathode off gas is discharged from a pipe 222, and anode off gas is discharged from a pipe 220. A portion of hydrogen that has been supplied to the FC stack 121 but not used for generating power is mixed with the anode off gas and discharged from the pipe 220. Water resulting from the chemical reaction is discharged mainly from the pipe 222.

The power generated by the FC stack 121 is supplied to the motor 122 or the storage cell 123. The storage cell 123 temporarily stores the power generated by the FC stack 121. The motor 122 generates motive energy using the power generated by the FC stack 121 or the power stored in the storage cell 123.

An intake port 201 of the piping 200 has a filter through which air is admitted into the piping 200. The admitted air is compressed by a compressor 202, and the compressed air is humidified by a humidifier 203, and supplied to the FC stack 121.

Air discharged from the pipe 222 of the FC stack 121 is discharged into atmosphere via a muffler 213.

A hydrogen tank 240 stores high-pressure hydrogen, and the stored hydrogen is supplied to the FC stack 121 via pipes 207, 205. The hydrogen tank 240 is connected to the pipe 207 via a source valve 211. A valve 206 is disposed between the piping 207 and 205. The flow of hydrogen may be interrupted by closing each of the valves 211, 206. Hydrogen may be supplied from the hydrogen tank 240 to the FC stack 121 by opening both the valves 211, 206. A pressure gauge 210 capable of detecting the hydrogen pressure within the pipe 207 is provided therein.

The hydrogen discharged from the pipe 220 is re-circulated by the pump 213 to the pipe 207 through the check valve 212. The check valve 212 has a function to prevent the hydrogen from reversely flowing from the pipe 207 to the pipe 223. The check valve 212 is automatically opened or closed in response to the difference in the pressure between the pipe 223 and the pipe 207. If the pump 213 does not apply pressure to hydrogen within the pipe 223, the check valve 212 is closed.

The pipe 223 is connected to a valve 214. When the valve 214 is opened, the hydrogen discharged from the pipe 220 flows into atmosphere via a dilution device 215 which serves to dilute the concentration of hydrogen discharged into atmosphere by mixing air discharged from the pipe 222 with the hydrogen discharged from the pipe 223.

The controller 110 constitutes a micro-computer including CPU, ROM, and RAM, functioning in controlling an operation of the fuel cell system 100. FIG. 1 is shown as a block diagram representing each function realized by the controller 110. The respective function blocks will be realized by executing the control program stored in ROM or RAM of the controller. At least a portion of the function blocks may be realized with hardware.

The controller 110 of the fuel cell system 100 serves to detect the hydrogen leakage of the valves 206, 211 by realizing the respective function blocks. The controller 110 controls the valve closing/opening operation of the valves 206, 211, 214 and other valves in order to detect the leakage. The controller 110 controls the operation of the power generation system 120. The valves 206 and 211 are called as the outlet valve and the inlet valve, respectively.

An adjustment section 111 controls valve opening/closing operation of the outlet valve 206 and the inlet valve 211, and operation of the power generation system 120. The adjustment section 111 adjusts the hydrogen pressure within the pipes 205, 207 to a predetermined pressure such that the outlet valve and the inlet valves 206, 211 are closed. The adjustment section 111 adjusts the pressure within the pipe 207 to be lower than the pressure within the hydrogen tank 240, and adjusts the pressure within the pipe 205 into the pressure further lower than the pressure within the pipe 207.

More specifically the adjustment section 111 stops operating the pump 213, and opens the valve 214 so as to reduce the pressure within the pipe 223 in order to prevent the check valve 212 from being opened in the subsequent pressure adjustment period. The hydrogen within the pipe 205 is consumed by the FC stack 121, and the outlet valve 206 and the inlet valve 211 are operated to adjust the pressure. The adjustment section 111 executes the pressure adjustment in the manner to be described below.

A detection section 112 detects the hydrogen pressure within the pipe 207 by means of a pressure gauge 210. The pressure adjustment may be realized by the adjustment section 111 based on the pressure within the pipe 207 measured by the detection section 112.

A diagnostic section 113 detects the hydrogen leakage of the outlet valve 206 and/or the inlet valve 211 while detecting the pressure by the detection section 112. The pressure change within the pipe 207 is detected in a state where the adjustment section 111 is allowed to perform the pressure adjustment within the pipes 205, 207. If the pressure within the pipe 207 increases, it is determined that the inlet valve 211 has a leak. If the pressure within pipe 207 decreases, is determined that the outlet valve 206 has a leak.

B: Control Routine

Figure 2:
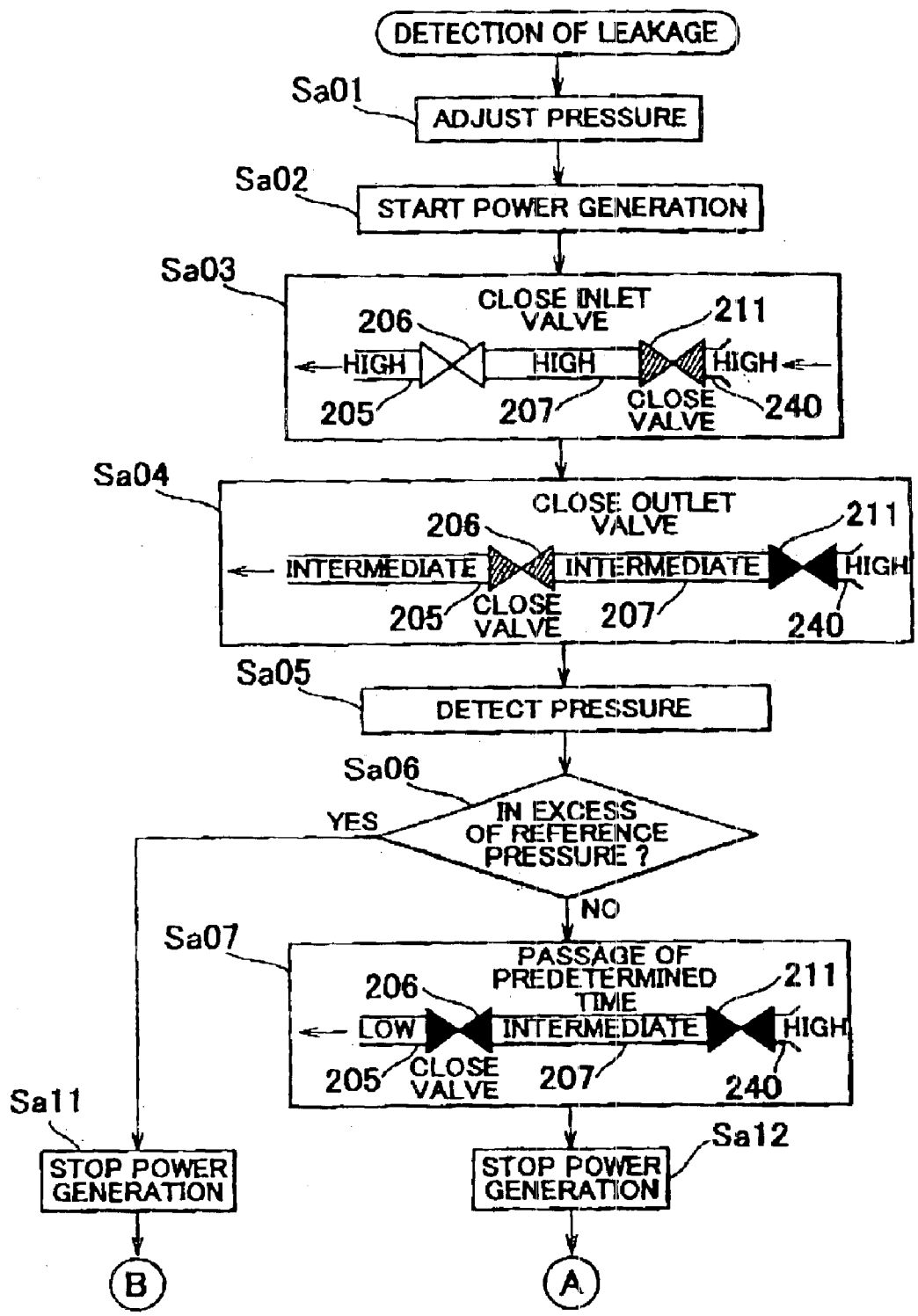
FIG. 2 is a flowchart representing a first half of the control routine for detecting a fluid leakage.
Figure 3:
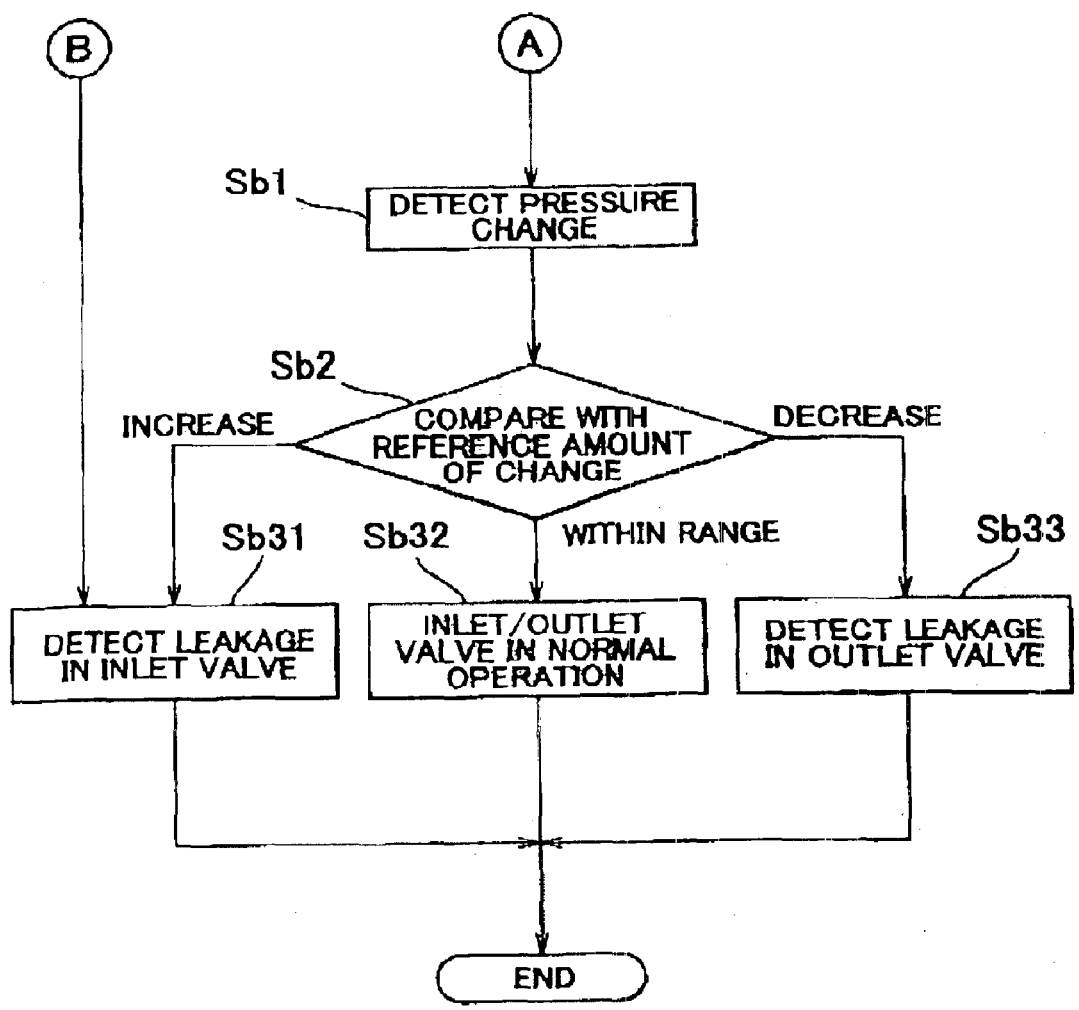
FIG. 3 is a flowchart representing a second half of the control routine for detecting the fluid leakage.
Figure 4:
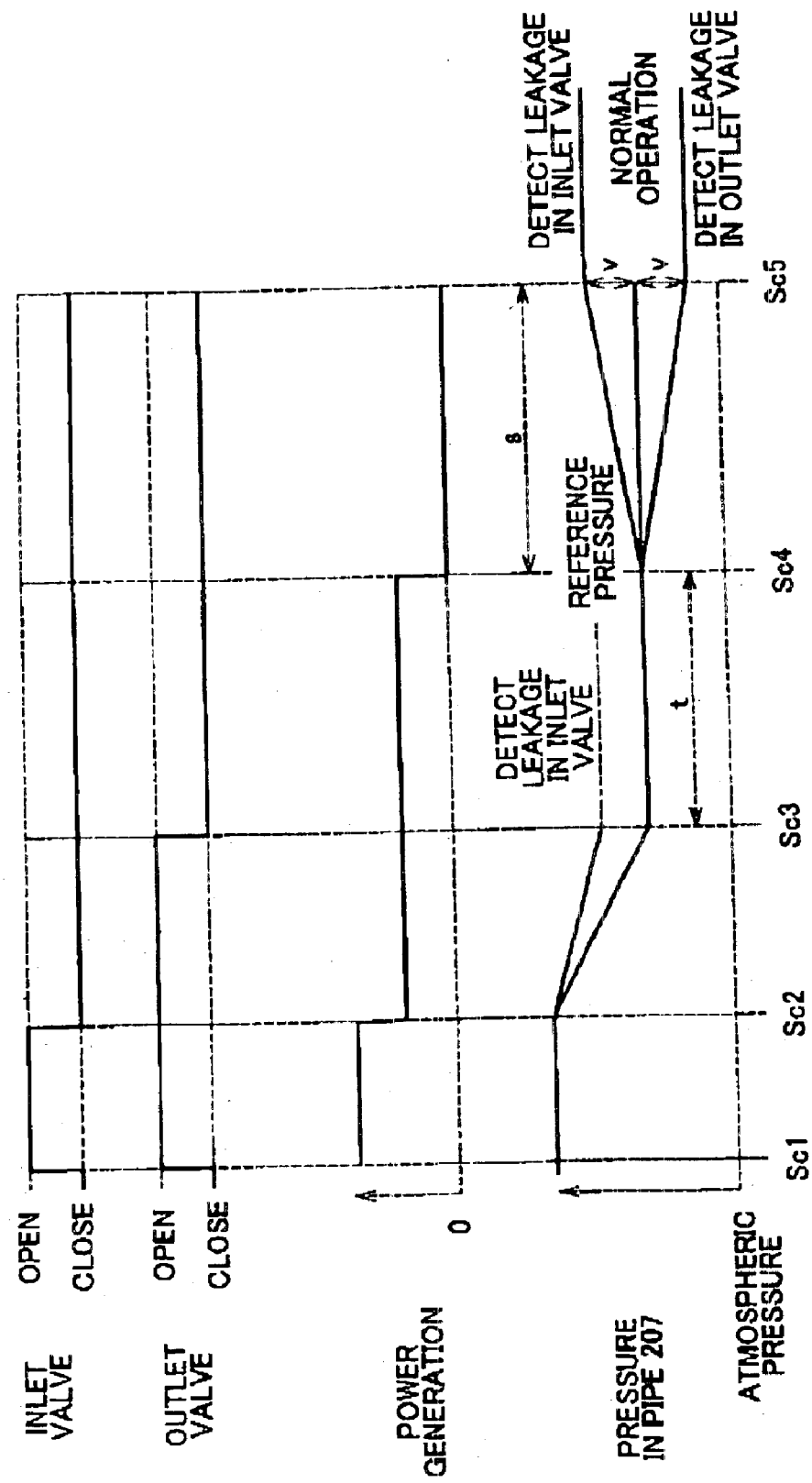
FIG. 4 is a timing chart showing the routine for detecting the fluid leakage.

FIG. 2 is a flowchart representing a first half of the control routine for the leakage detection. FIG. 3 is a flowchart representing a second half of the control routine for the leakage detection. FIG. 4 is a timing chart that represents the procedure for the leakage detection. The diagnostic section 113 determines the leakage of hydrogen out of the outlet valve 206 and the inlet valve 211 by executing the control routine as shown in FIGS. 2, 3, and 4. It is assumed that the leakage detection is executed when the fuel cell system 100 is stopped so as not to be influenced by the aforementioned leakage detection process.

Referring to the flowchart of FIG. 2, in step Sa01, the adjustment section 111 stops operating the pump 213 and opens the valve 213 in response to an instruction from the diagnostic section 113 so as to reduce the pressure within the pipe 223. This process is executed for preventing the check valve 212 from being opened in the course of the subsequent pressure agent.

In step Sa02, the adjustment section 111 opens the outlet valve 206 and the inlet valve 211 to allow the power generation system 120 to start its operation. The supply of hydrogen from the pipe 205 to the FC stack 121 is started. At a timing Sc1 of the timing chart shown in FIG. 4, step Sa02 is executed.

The leakage detection process as aforementioned is executed in the state where the fuel cell system 100 is stopped. Accordingly, power generated by the FC stack 121 is not supplied to the motor 122 but to the storage cell 123. The power supplied to the storage cell 123 can be utilized for activating the motor 122 after completion of the leakage detection.

In step Sa03, the adjustment section 111 closes the inlet valve 211. This may stop the hydrogen flow from the hydrogen tank 240 to the pipe 207. As a result, each pressure within the pipes 207, 205 starts decreasing. In step Sa03, the hydrogen consumption quantity is adjusted such that the pressure within the pipe 207 is decreased within an appropriate time period, and the power generation by the FC stack 121 is also adjusted. Step St03 is executed at a timing Sc2 of the timing chart of FIG. 4 It is to be understood that the invention is not limited to the aforementioned embodiment in which the power generation quantity is decreased at the timing Sc2. Alternatively the power generation quantity may be kept at a constant value, or may be increased.

After an elapse of a predetermined period from the closing operation of the inlet valve 211, the outlet valve 206 is closed in step Sa04. The predetermined period may be set to the time taken for the pressure within the pipe 207 to become sufficiently higher than the atmospheric pressure, but to become sufficiently lower than the pressure within the hydrogen tank 240. Step Sa04 is executed at a timing Sc3 of the timing chart shown in FIG. 4.

The diagnostic section 113 determines the valve closing operation of the outlet valve 206 as well as the pressure within the pipe 207 via the detection section 112 in step Sa05. If the inlet valve 211 has a leak of hydrogen, the degree of decrease in the pressure within the pipe 207 at the timing from Sc2 to Sc3 becomes smaller than the degree of decrease in the pressure in the case of no hydrogen leakage. This is because the supply of hydrogen into the pipe 207 is continued owing to the leakage.

In step Sa06, it is determined whether the pressure within the pipe 207 exceeds a predetermined reference pressure. If Yes is obtained in step Sa06, that is, it is determined that the pressure within the pipe 207 exceeds the reference pressure, the process proceeds to step Sa11 where power generating operation of the power generation system 120 is stopped. The process further proceeds to step Sb31 of the flowchart shown in FIG. 3 where the leakage of the inlet valve 211 is determined. The reference pressure is set so as to exceed the range of the pressure within the pipe 207 to be measured in step Sa05 in the case where the inlet valve 211 has no leakage.

The detection of leakage executed in steps Sa05, Sa06 may be executed before closing the outlet valve 206 in step Sa04.

If No is obtained in step Sa06, that is, it is determined that the pressure within the pipe 207 does not exceed the reference pressure, the process proceeds to step Sa07 for waiting until passage of a predetermined period t. During the predetermined period t, the pressure within the pipe 205 is decreased owing to the hydrogen consumption of the FC stack 121. The predetermined period t is set to the time taken for the pressure within the pipe 205 to become sufficiently lower than the pressure within the pipe 207, for example, to sufficiently reach the atmospheric pressure.

The pressure within the pipe 207 becomes lower than the pressure within the hydrogen tank 240, and the pressure within the pipe 205 becomes further lower than the pressure within the pipe 207. The pressure adjustment is, then, terminated. In step Sa12, power generating operation by the power generation system 120 is stopped at a timing Sc4 of the timing chart shown in FIG. 4.

In step Sb1 of the flowchart shown in FIG. 3, the pressure change in the pipe 207 is detected at a timing Sc5 after an elapse of a predetermined time s from the timing Sc4. More specifically an amount of the pressure change within the pipe 207 at the timing from Sc4 to Sc5 is detected.

In step Sb2, the detected amount of the pressure change at the timing from Sc4 to Sc5 is compared with a predetermined reference amount of change v. If an absolute value of the amount of the pressure change is equal to or smaller than the reference amount of change v, the process proceeds to step Sb32 where it is determined that there is no leakage both in the outlet valve 206 and the inlet valve 211. If the absolute value of the amount of the pressure change exceeds the reference amount of change v, the process proceeds step Sb31 or Sb33 where it is determined that there is leakage both in the outlet valve 206 and the inlet valve 211. If the pressure within the pipe 207 increases such that its absolute value exceeds the reference amount of change v, it is determined that the inlet valve 211 has the leakage in step Sb31. If the pressure within the pipe 207 decreases such that its absolute value exceeds the reference amount of change v, it is determined that the outlet valve 206 has the leakage in step Sb33.

The predetermined time s is set to the time taken for the pressure within the pipe 207 to become equal to or larger than the reference amount of change v in the case where the inlet valve 211 or the outlet valve 206 has the leakage.

The fuel cell system 100 makes it possible to detect the hydrogen leakage in both the inlet valve 211 and the outlet valve 206 at the same time easily and quickly. According to the adjustment of pressure within the pipes 205, 207 as described referring to the flowcharts of FIGS. 2 and 3, a required pressure adjustment can be easily and quickly realized with a simple structure. As the hydrogen within the pipe 205 is consumed by the FC stack 121, waste of hydrogen or discharge of the hydrogen to atmosphere may be prevented.

In this embodiment, hydrogen within the pipe 205 is consumed by the FC stack 121. The hydrogen consumption, however, is not limited to the aforementioned case. For example, the pipe 205 may be connected to the hydrogen tank or the metal hydride (hydrogen absorbing alloy) in place of the FC stack 121. Alternatively hydrogen within the pipe 205 may be consumed, stored or absorbed by the hydrogen tank, metal hydride and the like.

The fluid may be formed not only as hydrogen but also as various types of fluid so as to be applied to various types of system. For example, the fluid may be formed as gas such as propane gas, oxygen, and liquid such as gasoline, petroleum, cleaning liquid, clean water, waste water and the like.

In the embodiment, each leakage in two valves is detected at the same time. It may be structured to detect each leakage in three or more valves at the same time. For example, it may be structured to detect each leakage in a plurality of valves for passing hydrogen into the pipe 207 and a plurality of valves for discharging the hydrogen from the pipe 207 at the same time.

C: Modified Example 1

Figure 5:
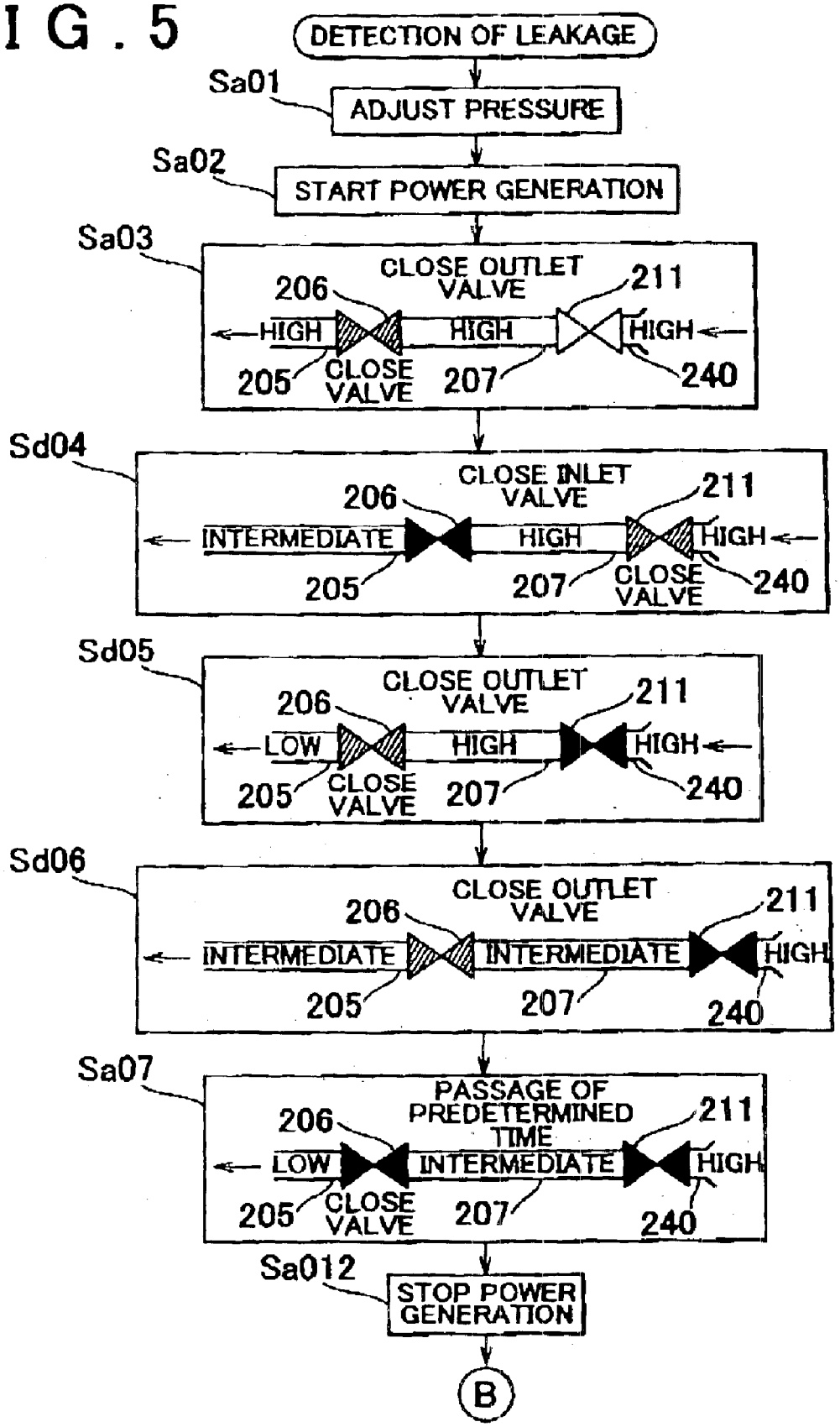
FIG. 5 is a flowchart representing a control routine for detecting the fluid leakage according to a modified example.
Figure 6:
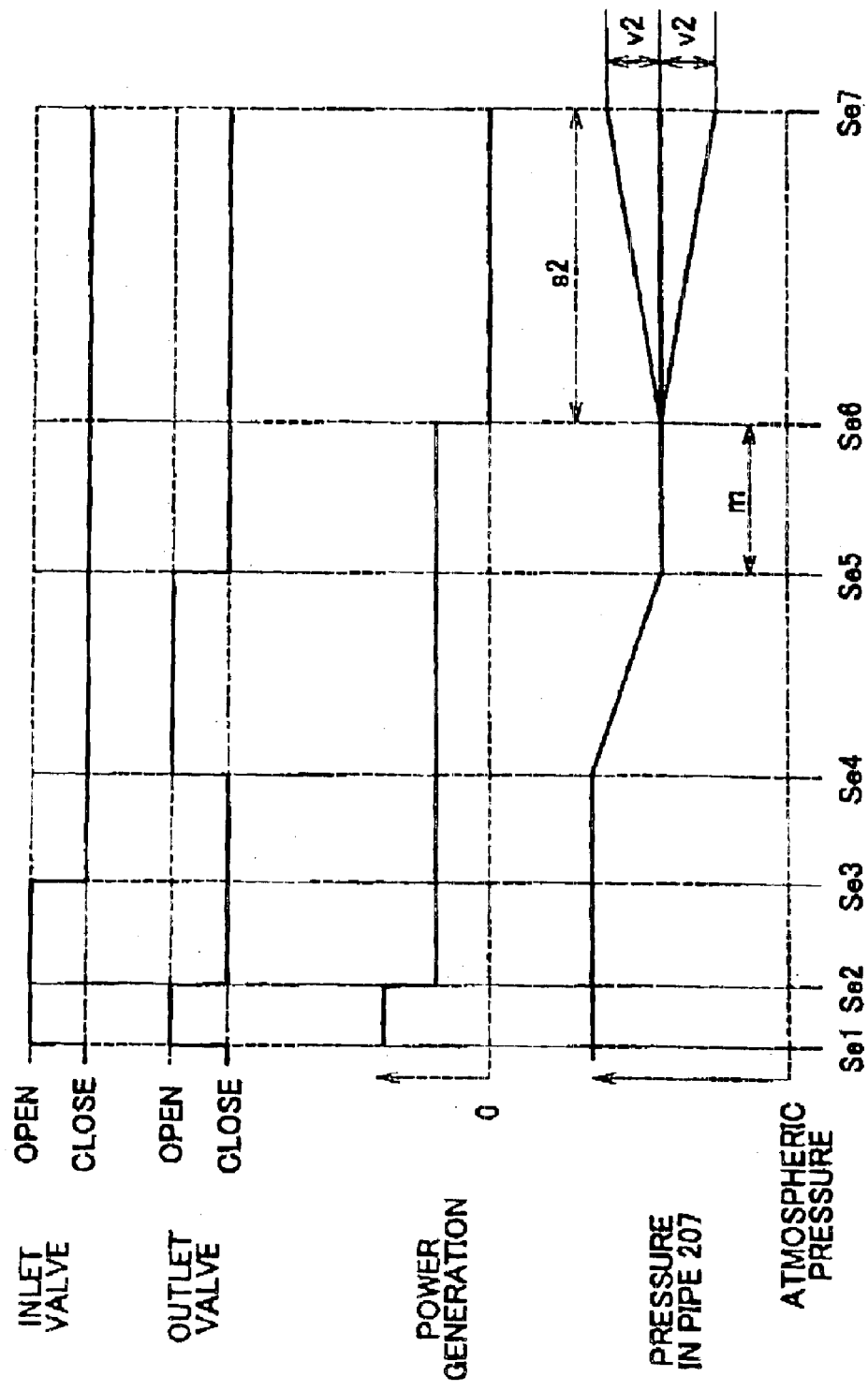
FIG. 6 is a timing chart showing the routine for detecting the fluid leakage according to the modified example.

FIG. 5 is a flowchart resenting a control routine for leakage detection according to a modified example of the invention. FIG. 6 is a timing chart representing the control routine for leakage detection according to the modified example.

Steps Sa01, Sa02 of the flowchart shown in FIG. 5 are the same as those shown in the flowchart of FIG. 2. Upon drop in the pressure within the pipe 223, the power generation system 120 starts its power generating operation.

In step Sd03, the adjustment section 111 closes the outlet valve 206 at a timing Se2. This may decrease the pressure within the pipe 205 while keeping the pressure within the pipe 207 upstream of the outlet valve 206 high.

In step Sd04, the inlet valve 211 is closed at a timing Se3. In step Sd05, the outlet valve 206 is opened at a timing Se4. Then the pressure within the pipe 207 starts decreasing. When the pressure within the pipe 207 decreases to reach a predetermined pressure, the outlet valve 206 is closed in step Sd06 at a timing Sc5. The predetermined pressure is set to the value that is sufficiently higher than the atmospheric pressure but sufficiently lower than the pressure within the hydrogen tank 240.

In step Sa07, a passage of the predetermined time m is waited, and the adjustment of each pressure within the pipes 205, 207 into a desired state is completed at a timing Se6. In step Sa12 identical to step shown in the flowchart of FIG. 2, the power generating operation performed by the power generation system 120 is stopped. Step Sb1 and subsequent steps shown in the flowchart of FIG. 3 are executed after execution of step Sa12. The predetermined time m is the time period taken for the pressure within the pipe 205 to become sufficiently lower than the pressure within the pipe 207 or to sufficiently reach the atmospheric pressure.

According to the control routine for the leakage detection as the modified example, the desired pressure adjustment can be easily realized even if the pipe system 200 is structured to momentarily uniformize the pressure both within the pipe 205 and pipe 207, for example, with the small passage capacity or small cross section area.

When the pressure within the pipe 207 decreases for the period from the time for closing the outlet valve 206 in step Sd03 of the flowchart shown in FIG. 5 to the time for opening the outlet valve 206 again in step Sd05, it may be determined that the outlet valve 206 has the leakage.

The way for adjusting the pressure within the pipes 205, 207 may take various forms. For example, the pressure within the pipes 205, 207 may be adjusted from the state where each pressure within those pipes 205, 207 is close to the atmospheric pressure, and only the hydrogen tank 240 is at high pressure by operating the inlet valve 211 and the outlet valve 206.

D: Modified Example 2

In step Sb33 of the flowchart shown in FIG. 3, the leakage in the outlet valve 206 is determined. However, the leakage in the pipe 207 caused by its crack portion may be determined in step Sb33 of the flowchart shown in FIG. 3. This makes it possible to detect the leakage both in the inlet valve 211 and the pipe 207 at the same time quickly. The leakage in the pipe 207 may only be determined in step Sb33. Alternatively the leakage in the pipe 207 and the leakage in the outlet valve 206 may be determined at the same time in step Sb33.

Figure 7:
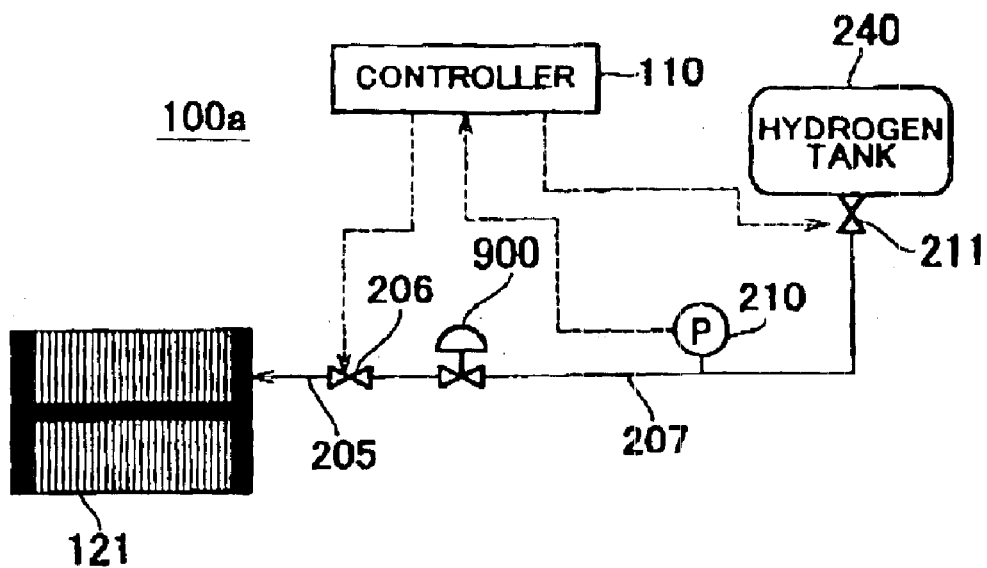
FIG. 7 is a schematic view showing the fuel cell system having a regulator on an intermediate portion of a piping.

FIG. 7 is a schematic view of a fuel cell system 100a including a regulator 900 provided on an intermediate portion of the pipe 207. FIG. 7 shows only the system for supplying hydrogen to the FC stack 121, and other elements of the structure are the same as those shown in the embodiment shown in FIG. 1. The regulator 900 serves to operate to uniformize the pressure between the regulator 900 and the outlet valve 206.

It is preferable to provide the pressure gauge 210 at a portion upstream of the regulator, that is, between the regulator 900 and the hydrogen tank 240.

In the aforementioned state, the inlet valve 211 and the outlet valve 206 are operated so as to realize the pressure state as described in the embodiment. It is preferable to set the reference pressure within the detection range to the value equal to or higher than the set pressure at a portion downstream of the regulator 900. If any one of the inlet valve 211, outlet valve 206, and the pipe 207 provided therebetween has the leakage, the pressure change may be detected by the pressure gauge 210 even under the pressure adjustment performed by the regulator 900. This makes it possible to determine the aforementioned leakage.

Figure 8:
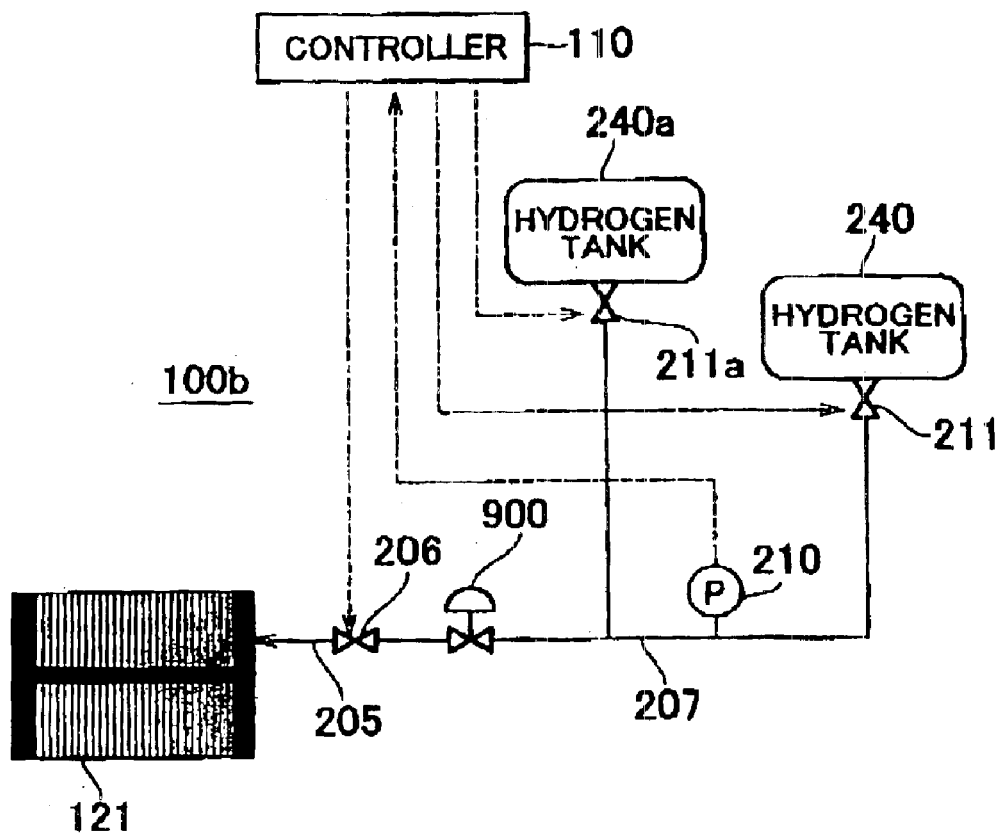
FIG. 8 is a schematic view showing the fuel cell system including a second hydrogen tank.

The aforementioned arrangement lay be applied to the case where a plurality of hydrogen tanks are provided. FIG. 8 is a schematic view of a fuel cell system 100b including a second hydrogen tank 240a. The second hydrogen tank 240a serves to store hydrogen for the pipe 207 via a valve 211a. The controller 110 controls an operation of the valve 211a of the second hydrogen tank 240a as well as the valve 211 of the first hydrogen tank 240.

In the stream of the system as shown in FIG. 8, the pressure adjustment may take various forms. For example, the valves 211, 211a may be opened or closed at the same timing, or at the different timing. It may be structured to operate only one of the valves 211 and 211a by keeping the other in a closed state.

If there is a leakage in at least one of the valves 211, 211a, the pressure change that is the same as the one owing to the leakage of the inlet valve 211 may be determined. This makes it possible to determine that at least one of the valves 211, 211a has the leakage. The aforementioned determination may be performed with respect to the leakage of the outlet valve 206 or the pipe 207 at the same time.

The detection apparatus and detection method have been described with respect of the embodiment of the invention. The aforementioned embodiment is used only for the purpose of making the invention comprehensive, and it is not intended to limit the invention. The invention may be changed or modified without departing from spirit and scope of the invention.

What is claimed is:

1. A fluid leakage detection apparatus comprising:
   a high-pressure fluid supply source;
   a fluid passage that passes the fluid from one end that locates at an upstream side close to the fluid supply source to the other end that locates at a downstream side;
   a first valve and a second valve each provided on an intermediate portion of the fluid passage from the upstream side;
   a detecting portion that detects a pressure of the fluid within a detection range between the first valve and the second valve;

an adjusting portion that adjusts a pressure within the detection range into a predetermined reference pressure, a pressure upstream of the first valve to be higher than the predetermined reference pressure, and a pressure downstream of the second valve to be lower than the predetermined reference pressure, respectively by operating the first valve and the second valve; and a determining portion that determines the leakage of the fluid based on a change in the detected pressure.

2. The fluid leakage detection apparatus according to claim 1, wherein the determining portion determines that the first valve has the leakage of the fluid when the detected pressure of the fluid within the detection range becomes higher than the predetermined reference value.

3. The fluid leakage detection apparatus according to claim 1, wherein the determining portion determines that one of the second valve and the fluid passage within the detection range has the leakage of the fluid when the detected pressure of the fluid within the detection range becomes lower than the predetermined reference pressure.

4. The fluid leakage detection apparatus according t claim 1, further comprising:

a supply pipe connected to the detection range, and that supplies the fluid thereto;

a check valve provided with the supply pipe, and that prevents a reverse flow of the fluid from the detection range to the supply pipe; and a reverse flow prevention portion provided for reducing a pressure of the fluid within the supply pipe prior to determination of the leakage.

5. The fluid leakage detection apparatus according to claim 1, wherein the adjusting portion closes the first valve that has been held in an open state, and upon elapse of a predetermined time period from closing of the first valve, further closes the second valve that has been held in an opened state.

6. The fluid leakage detection apparatus according to claim 5, wherein the determining portion determines that the first valve has the leakage of the fluid when the pressure within the detection range is higher than a predetermined pressure in a period from a time at which the first valve is closed to a time at which the second valve is closed.

7. The fluid leakage detection apparatus according to claim 1, wherein the adjusting portion closes the first valve after closing the second valve, and operates the closed second valve thereafter such that the pressure within the detection range becomes the predetermined reference pressure.

8. The fluid leakage detection apparatus according to claim 7, wherein the determining portion determines that one of the second valve and the fluid passage in the detection range has the leakage of the fluid when the detected pressure within the detection range becomes lower than a predetermined pressure in a period from a time at which the second valve is closed to a time at which the second valve is operated.

9. The fluid leakage detection apparatus according to claim 1, further comprising a fluid utilizing mechanism provided downstream of the second valve so as to be operated with the fluid, and wherein the adjusting portion serves to operate the fluid utilizing mechanism for reducing a pressure downstream of the second valve.

10. The fluid leakage detection apparatus according to claim 9, wherein the fluid utilizing mechanism comprises a fuel cell, and the fluid comprises hydrogen.

11. A fluid leakage detection method of detecting a leakage of a fluid in a system including a high-pressure fluid supply source, a fluid passage that passes the fluid from one end that locates at an upstream side close to the fluid supply source to the other end that locates at a downstream side, and a first valve and a second valve each provided on an intermediate portion of the fluid passage from the upstream side, the fluid leakage detection method comprising the steps of:

detecting a pressure of the fluid within a detection range between the first valve and the second valve;

adjusting a pressure within the detection range into a predetermined reference pressure, a pressure upstream of the first valve to be higher than the predetermined reference pressure, and a pressure downstream of the second valve to be lower than the predetermined reference pressure, respectively by operating the first valve and the second valve, and determining the leakage of the fluid based on a change in the detected pressure.

12. The fluid leakage detection method according to claim 11, wherein it is determined that the first valve has the leakage of the fluid when the detected pressure of the fluid within the detection range becomes higher than the predetermined reference value.

13. The fluid leakage detection method according to claim 11, wherein it is determined that one of the second valve and the fluid passage within the detection range has the leakage of the fluid when the detected pressure of the fluid with the detection range becomes lower than the predetermined reference pressure.

14. The fluid leakage detection method according to claim 11, wherein a fluid utilizing mechanism provided downstream of the second valve is operated with the fluid for reducing a pressure downstream of the second valve.

15. The fluid leakage detection method according to claim 11, wherein a reverse flow of the fluid from the detection range to a supply pipe connected thereto for supplying the fluid is prevented, and a pressure of the fluid within the supply pipe is reduced prior to determination of the leakage.

16. The fluid leakage detection method according to claim 11, wherein the first valve that has been held in an opened state is closed, and upon elapse of a predetermined time period from closing of the first valve, the second valve that has been held in an opened state is further closed.

17. The fluid leakage detection method according to claim 16, wherein it is determined that the first valve has the leakage of the fluid when the detected pressure within the detection range is higher than a predetermined pressure in a period from a time at which the first valve is closed to a time at which the second valve is closed.

18. The fluid leakage detection method according to claim 11, wherein the first valve is closed after closing the second valve, and the closed second valve is operated thereafter such that the pressure within the detection range becomes the predetermined reference pressure after closing of the first valve.

19. The fluid leakage detection method according to claim 18, wherein it is determined that one of the second valve and the fluid passage in the detection range has the leakage of the fluid when the detected pressure within the detection range becomes lower than a predetermined pressure in a period from a time at which the second valve is closed to a time at which the second valve is operated.

* * * * *